N. G. OLSON & A. T. BARROWS.
WAVE MOTOR.
APPLICATION FILED MAR. 28, 1912.
1,037,041.
Patented Aug. 27, 1912.
3 SHEETS—SHEET 1.
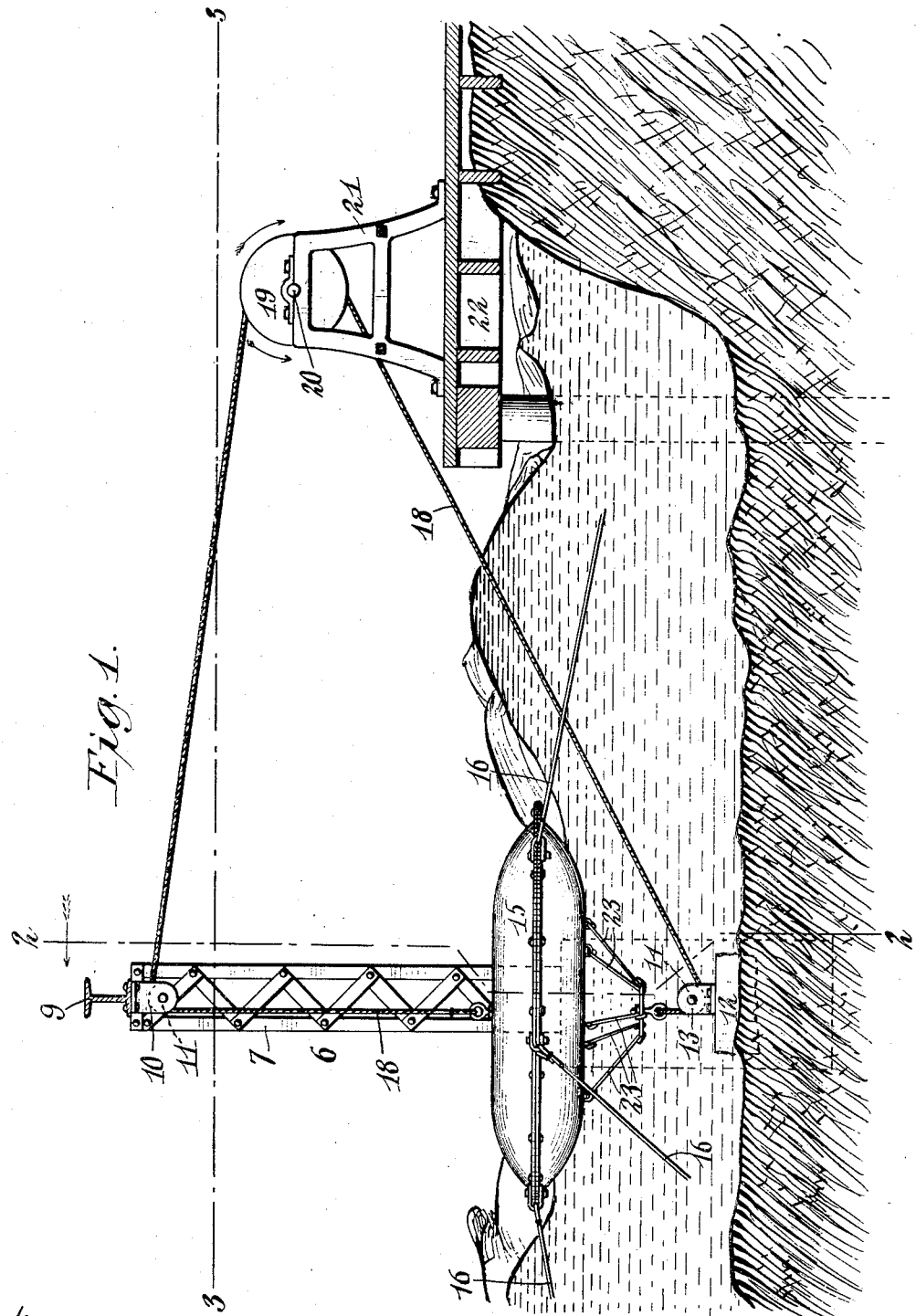

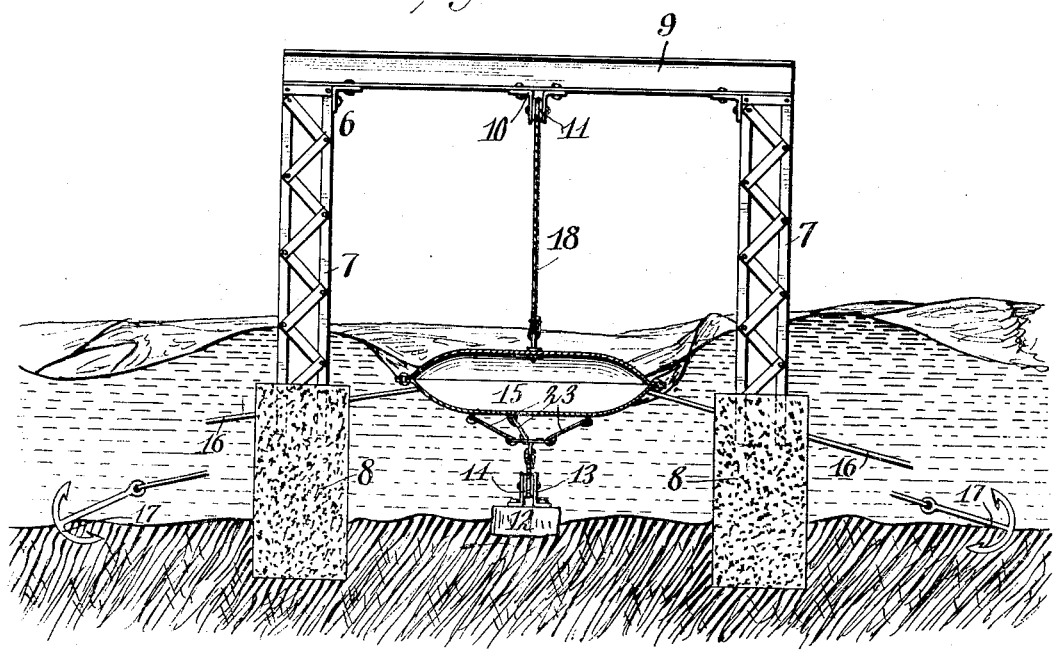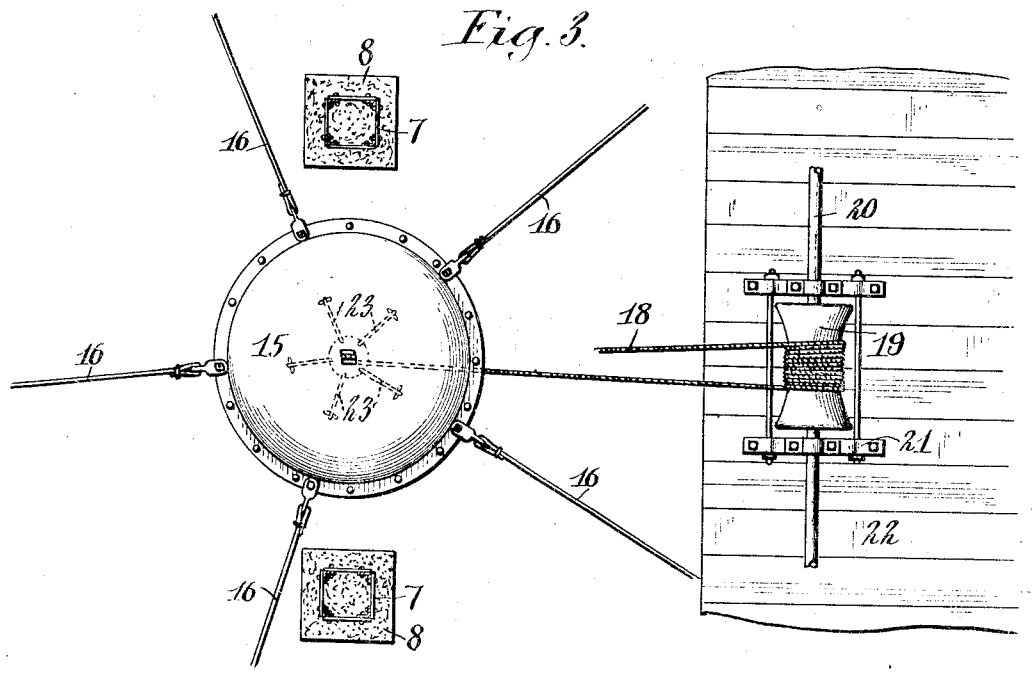

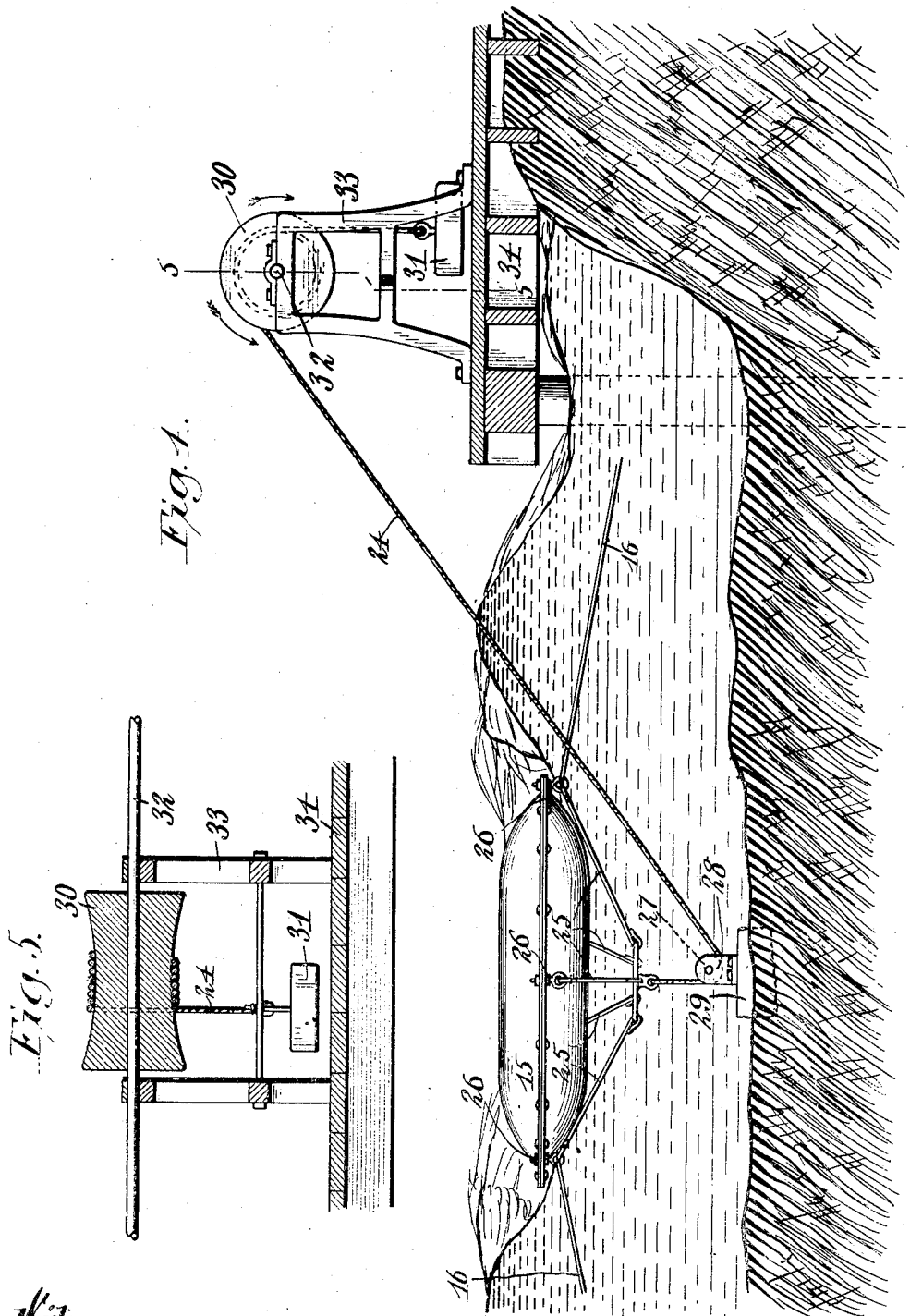

UNITED STATES PATENT OFFICE.

NELS G. OLSON, OF BUFFALO, NEW YORK, AND ARAD T. BARROWS, OF BRUNSWICK, MAINE.

WAVE-MOTOR.

1,037,041.　　　　Specification of Letters Patent.　Patented Aug. 27, 1912.

Application filed March 28, 1912. Serial No. 686,845.

*To all whom it may concern:*

Be it known that we, NELS G. OLSON, a subject of the King of Sweden, residing at Buffalo, in the county of Erie and State of New York, and ARAD T. BARROWS, a citizen of the United States, residing at Brunswick, in the county of Cumberland and State of Maine, have jointly invented certain new and useful Improvements in Wave-Motors, of which the following is a specification.

Our invention relates to wave motors adapted to utilize the power of waves for conversion in any suitable manner into constant power for running machinery, and has for its primary object the provision of a simple and inexpensive apparatus capable of use in connection with any natural body of water, the rise and fall of the waves being utilized to impart movement in a vertical or a substantially vertical plane to a float anchored to allow such movement.

It also has for its object the provision of movement-converting mechanism of simplified construction whereby the vertical or substantially vertical movements of a float actuated by the waves are converted into rotary movement to be used for storing water or for driving machinery directly or through the medium of the stored water, as may be desired.

To these ends our invention consists in the novel features of construction and in the arrangement and combination of parts to be hereinafter described and more particularly pointed out in the subjoined claims.

Figure 1 is a sectional elevation of a wave motor embodying the principles of our invention in what we now consider its preferred form. Fig. 2 is a transverse section taken on line 2—2, Fig. 1, on a reduced scale, looking in the direction of the arrow crossing said line. Fig. 3 is a horizontal section on a reduced scale taken on line 3—3, Fig. 1. Fig. 4 is a sectional elevation of a wave motor embodying the principle involved in a modified form. Fig. 5 is a transverse section taken on line 5—5, Fig. 4.

Referring now to the drawings in detail, similar numerals of reference refer to similar parts in the several figures.

The reference numeral 6 designates a frame which comprises two uprights 7 having their lower ends embedded in or fastened in any suitable manner to sub-structures 8 formed of concrete or the like. These uprights are connected at their upper ends by the cross-beam 9, to the underside of which is secured a bracket 10 in which is rotatably held a cable sheave 11. Arranged centrally between the sub-structures 8 is an anchor block 12 having secured at its upper side a bracket 13 in which is secured a cable sheave 14. The sub-structures 8 and anchor block 12 are built into the bed of the body of water so that the super-structure secured thereto, which is preferably constructed of iron, will withstand the force of the waves and elements of the weather. Manifestly any other structure suitable for the purpose may be utilized and in some places the natural formation of the cliff or shore may be utilized to support the parts intended to be supported by the framework described.

15 designates a float which is circular in formation and comparatively flat to provide an extended surface area and to assure, as near as may be, a vertical movement of the same. This float is positioned centrally between the uprights 7 and from its periphery has extending outwardly a series of radiating anchor cables 16. These cables may extend a considerable distance from the float and be anchored, as at 17, Fig. 2. By extending these cables a considerable distance the float is allowed a vertical or substantially vertical motion while being permanently held in place between the uprights 7.

Secured centrally to the float at the top is one end of a power cable 18 which passes upwardly therefrom and around the sheave 11, thence shoreward where it passes around a drum 19 secured to a shaft 20 which is journaled in a frame 21 of any suitable construction, said frame being fastened to a suitable structure 22 which may extend out over the body of the water, if desired. Said power cable is wound around the drum several times and thence directed outward and downward toward the bed of the body of the water so as to pass around the sheave 14 and finally upward for connection with the ends of a series of equalizing cables 23 fastened equal distances from the center of the float at the underside thereof and converging therefrom toward a common point, said series of cables being fastened to the float as described and having common connection with the power cable 18 to assure an even downward movement of the float and stabilize the float so that the action of the waves in coming in contact therewith cannot upset the float or cause it to tilt, this being particularly assured by reason of the power cable 18 being held taut, not only the stretch thereof passing from the upper side of the float to the drum, but also the stretch thereof secured to the equalizing cables 23 and passing therefrom to said drum. It is apparent that by extending the anchor cables outward a suitable distance in radiating lines, sufficient slackness is provided to allow the rise and fall of the float with the waves, but such slackness will not admit of the float moving materially out of the plane in which it is positioned. When the float is caused to rise by the waves the stretch of the power cable 18 extending from the top of the float to the drum 19 is slackened, while the stretch of said cable extending from the drum to the series of converging equalizing cables 23 is drawn upon in a direction away from said drum, thus allowing the float to rise and the motion of the cable to be imparted to the drum so as to rotate the latter in one direction. When the float lowers with the passing of the waves the stretch of the power cable 18 extending from the top of the float to the drum is drawn upon while the stretch of the cable extending from the drum to the converging equilizing cables secured to the underside of the float is slackened, thus permitting the float to lower and causing the drum to rotate in the opposite direction. It is clear, therefore, that the shaft to which the drum is secured is given alternatingly reversible rotary movement which may be utilized for actuating any alternating pump for pumping water to any desired height, or by means of suitable mechanism interposed between the drum and the part actuated by the shaft, said alternatingly reversible rotary movement may be converted into direct rotary motion.

In the modification shown in Figs. 4 and 5 the framework is dispensed with, also the connection between the upper side of the float and the drum. In this modification a power-cable 24 has connection with one of the ends of a series of converging equalizing cables 25 arranged underneath the float, which equalizing cables have their opposite ends secured to the periphery or marginal portion of the float, as at 26, said power cable passing from its point of connection to said equalizing cables downward around a sheave 27 secured in a bracket 28 fastened to an anchor block 29 rising from the bed of the body of water. From the sheave 27 said cable is directed upwardly and shoreward and is wound upon a drum 30, the end of the cable extending downward from the drum and having secured to its extremity a weight 31. The drum 30 is fastened to a shaft 32 in any approved manner, which shaft is journaled in a frame 33 suitably mounted on a platform 34 on the shore or extending outward from the shore.

The float is caused to rise by the waves, and when thus actuated it draws upon the power cable 24 to rotate the drum 30 in one direction and as the waves pass away from the float the weight 31 serves to rotate the drum 30 in an opposite direction, thus causing the float to be drawn downward.

Having thus described our invention, what we claim is,—

1. A wave motor comprising a float, means for causing said float to move in a substantially vertical plane, a drum rotatably mounted, converging equalizing cables secured to said float, and a power cable connected to said equalizing cables and passing around said drum.

2. A wave motor comprising a float, diverging anchor cables connected to said float, a rotatable element, a cable sheave located above the center of said float, a cable extending directly upward from the center of said float and passing around said sheave and thence to said rotatable element, and means connected to the underside of said float to cause it to be drawn downward in a vertical or substantially vertical plane.

3. A wave motor comprising a float, diverging anchor cables connected to said float, a drum rotatably mounted, cable sheaves located above and beneath said float in a plane passing through the center of the float, a power cable wound upon said drum and extending therefrom around said sheaves and thence toward said float for connection thereto.

4. A wave motor comprising a float, diverging anchor cables having one of their ends connected to the periphery of said float, a drum rotatably mounted, and a power cable wound between its ends upon said drum and having its ends connected to the top and bottom, respectively, of said float to cause it to move in a vertical or substantially vertical plane.

5. A wave motor comprising a float, diverging anchor cables connected to said float, a rotatable element, converging equalizing cables secured to the underside of said float, and a power cable connected to said rotatable element and passing therefrom for connection to the top of said float at its center and to all of said equalizing cables.

6. The combination with a frame having uprights rising from the bed of a body of water, a beam connecting the upper ends of said uprights and having a cable sheave secured thereto, and an anchor block rising from said bed centrally between said uprights and having a cable sheave secured thereto, of a float positioned centrally between said uprights, equalizing cables secured to the underside of said float and directed inwardly and downward from their points of connection to said float toward a common point, a rotatable drum a distance from said float, and a power cable wound around said drum and passing therefrom in two stretches, thence around said sheaves and finally toward the center of said float, one end being connected centrally to the upper side of said float and the other end having connection with said equalizing cables.

In testimony whereof, we have affixed our signatures in the presence of two subscribing witnesses.

NELS G. OLSON.
ARAD T. BARROWS.

Witnesses for Nels G. Olson:
EMIL NEUHARD,
ELIZABETH HEINTZ.

Witnesses for Arad T. Barrows:
CHARLES L. BOWKER,
JOHN W. RILEY.